United States Patent [19]
Carey

[11] 3,927,854
[45] Dec. 23, 1975

[54] AUTOMOTIVE SEAT SUSPENSION SYSTEM
[76] Inventor: Milburn K. Carey, 51 Old Plank Lane, Chagrin Falls, Ohio 44022
[22] Filed: Feb. 27, 1974
[21] Appl. No.: 446,273

[52] U.S. Cl. .................. 248/372; 248/400; 248/390
[51] Int. Cl.² ........................................ A45D 19/04
[58] Field of Search .......... 248/372, 399, 400, 162, 248/396, 397, 404, 388, 389, 378, 390; 297/307, 347

[56] References Cited
UNITED STATES PATENTS

| | | | |
|---|---|---|---|
| 762,381 | 6/1904 | Bruce | 248/389 |
| 1,362,042 | 12/1940 | Roe | 248/388 |
| 2,300,422 | 11/1942 | Hickman | 297/307 |
| 2,546,268 | 3/1951 | Legris | 248/399 |
| 2,600,005 | 6/1952 | Kronhavs et al. | 297/347 |
| 2,636,544 | 4/1953 | Hickman | 248/399 |
| 2,768,674 | 10/1956 | Phenix | 248/388 |

FOREIGN PATENTS OR APPLICATIONS
711,076   6/1965   Canada .............................. 297/347

Primary Examiner—Roy D. Frazier
Assistant Examiner—Robert A. Hafer
Attorney, Agent, or Firm—Teare, Teare & Sammon

[57] ABSTRACT

An automotive seat suspension system including a base frame assembly for mounting on a vehicle floor and a seat frame assembly for pivotally mounting a seat on the base frame assembly. The forward end of the seat frame assembly is resiliently mounted on the base frame assembly via leaf-spring mechanisms with fluid power means resiliently mounting the rear of the seat frame assembly on the base frame assembly for causing controlled backwards and forward movement of the seat with the line of action of the seat being displaced in rolling deformation of the spring mechanisms.

11 Claims, 7 Drawing Figures

AUTOMOTIVE SEAT SUSPENSION SYSTEM

BACKGROUND OF THE INVENTION

The present invention relates to a automotive seat, and more particularly relates to an improved construction for a suspension system for an automotive seat which has advantageous application for use in vehicles, such as trucks, buses and the like.

Heretofore, it has been recognized that the syndrome affects of "truck driver's back" cause severe discomfort to truck drivers and to operators of heavy equipment both on and off the road. Such discomfort results, in part, from road shock transmitted through the vehicle body and from sudden forward and reverse movement of the operator's body forward and away from the back of the seat. The latter movement is commonly referred to as "back slap" which results from forces which arise from acceleration and deacceleration of the vehicle as well as from forward and rearward pitching of the vehicle on its own suspension system. For example, when the front end of a trailer is supported by a fifth wheel and when the rear wheels of the tractor encounter an irregularity in the road, the fifth wheel and front of the trailer tend to rise, thereby causing a forward pitch of the tractor which "whips" the operator. This action not only results in discomfort and operator-fatigue, but also results in other harmful effects including possible injury to the internal organs of the operator. In the past, prior art suspension systems have included various types of spring and/or fluid piston arrangements to absorb some of the vibration and shock generated during normal use of the vehicle. More recently, cylindrical boots of elastomeric construction have been provided for pneumatic shock absorption. It has been found, however, that such prior devices are not completely satisfactory in obviating the aforementioned difficulties resulting in operator-fatigue, discomfort, internal damage and/or injury and the like.

For typical prior art suspension systems, reference may be had to U.S. Pat. No. 3,075,736, No. 3,276,736, No. 3,298,654, No. 3,603,350 and No. 3,740,792, for example.

SUMMARY OF THE INVENTION

The present invention relates to an automotive seat including a resilient suspension system for pivotally supporting a seat, the system comprising a base frame assembly adapted for mounting on the floor of a vehicle, a set frame assembly adapted for mounting a seat, at least one loop-like spring means in the form of a generally U-shaped leaf spring affixedly attached at one end to the seat frame assembly and operably connected at its other end to the base frame assembly for resiliently mounting the seat frame assembly in spaced apart relation relative to the base frame assembly, and fluid power means in the form of an air spring mounted on the base frame assembly adjacent the end opposite the spring means and operably connected to the seat frame assembly for generally vertically mounting the latter relative to the base frame assembly. In a preferred form, the spring means include a pair of space, oppositely disposed generally parallel oriented leaf-spring members of generally U-shaped configuration which open in a direction toward an air spring which resiliently mounts the seat frame assembly on the base frame assembly. Upon inflation or deflation of the air spring, the leaf-spring members resiliently deform so as to be displaced resulting from a generally rolling compressive force which acts to move the seat forward and backward in a smooth floating relation to give a high quality "ride" to the seat. The leaf-spring members are of a novel construction and arrangement so as to make the stress on the spring material as even as possible at all points upon the inflation or deflation of the air spring. By this arrangement, there is provided a resilient floating action in the seat which minimizes "back slap" and other similar types of operator discomfort.

DESCRIPTION OF THE PREFERRED EMBODIMENTS

Figure 1:
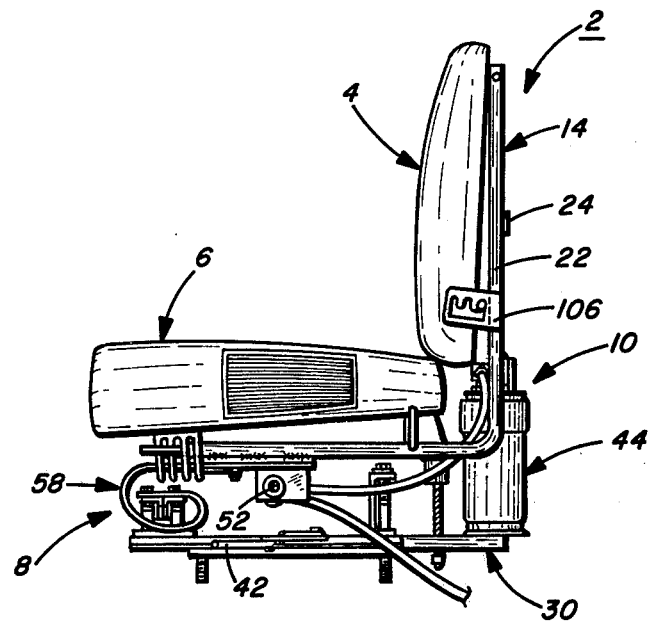
FIG. 1 is a side elevation view showing the novel automotive seat of the present invention.
Figure 2:
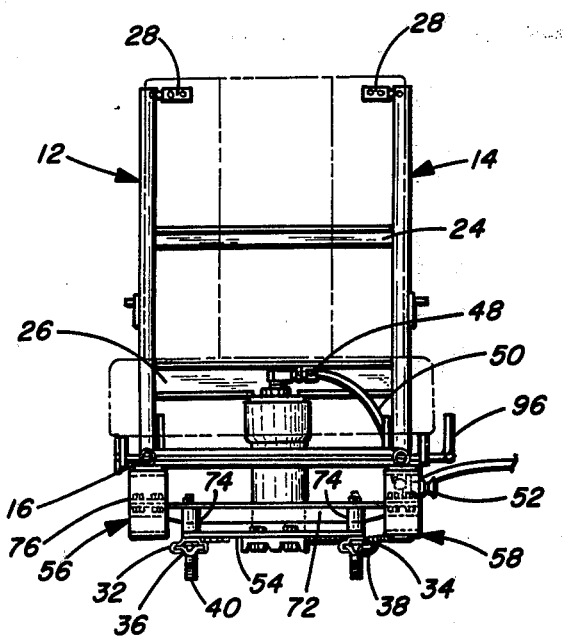
FIG. 2 is a front elevation view of the automotive seat of FIG. 1, but with the seat and back cushions removed for purposes of clarity.

Referring now more specifically to the drawings, wherein like reference characters are used throughout to designate like parts, and generally to FIGS. 1 and 2 thereof, there is illustrated an automotive seat, designated generally at 2, including a rear or back cushion 4 and a bottom or seat cushion 6. The cushions 4 and 6 comprising the seat are mounted on a frame assembly, designated generally at 8, which may be attached, such as by suitable bolts or the like, to the floor (not shown) of the vehicle. Since the seat represents only one of many similar seats which can be used in vehicles, the term "automotive vehicle" seat is used herein to cover all seats in a generic manner.

The frame 8 in the embodiment shown includes a seat frame assembly 10 including a pair of spaced, parallel support members 12 and 14 preferably of hollow tubular construction. The members 12 and 14 are of a generally L-shaped configuration defined by generally horizontally extending leg portions 16 and 18 and a pair of spaced, generally vertically upstanding leg portions 20 and 22 which provide a support for the seat 6 and rear 4 cushions, respectively. The legs 20 and 22 are integrally joined together by cross-plates 24 and 26 (FIG. 2) with the rear cushion 4 being detachably connected thereto by suitable mounting brackets 28. The legs 16 and 18 are integrally joined together by a cross-member 30 to provide the unitary seat-like construction shown. Preferably, the leg portions 16 and 18 are disposed generally at right angles to the leg portions 20 and 22 with the leg portions 16 and 18 disposed generally parallel to the horizontal plane of the vehicle floor in the normal operating condition of the seat structure.

As shown, the seat frame assembly 10 is resiliently mounted on a base frame assembly 30 including a pair of spaced, parallel rail members 32 and 34 (FIG. 2) which are mounted for horizontal forward and backward movement on guide bars 36 and 38 which, in turn, are fixedly attached to the floor of the vehicle by suitable fasteners 40, such as bolts or the like. The base frame assembly may be provided with an adjustment mechanism, designated generally at 42 (FIG. 1), for adjusting the forward and backward position of the seat, as known in the art.

In the invention, the seat frame assembly 10 is resiliently mounted at one end to the base frame assembly 30 by means of a pneumatic spring mechanism 44. The mechanism 44 is of a generally conventional construction comprising an elastomeric housing 46 which includes an external coupling 48 adapted to receive a fluid supply line 50, the opposite end of such supply line being connected to a control valve 52 (FIGS. 1, 2 and 5) for regulating the fluid pressure within the mechanism 44. The control valve 52 thus provides the supply power to the spring mechanism 44 to inflate the same or for deflating the same so as to achieve the desired fluid pressure therewithin. The lower end of the spring mechanism 44 is supported on and fixedly attached to a cross-member 54 (FIG. 2), while the upper end thereof is fixedly attached to the cross-member 26 of the seat frame assembly 10. In reference, therefore, to the vertical adjustment of the seat frame assembly 10, the spring mechanism 44 is illustrated in its deflated condition in solid line of FIG. 3. When it is desired to raise the seat frame assembly, fluid is supplied through valve 52 to the spring mechanism 44, thereby causing the elastomeric housing 46 thereof to resiliently expand. Since the spring mechanism 44 is mounted on the stationary base frame assembly 30, expansion of the spring mechanism 44 will result in raising of the seat frame assembly 10 in a pivotal, rolling manner, as will hereinafter be more fully described.

Figure 4:
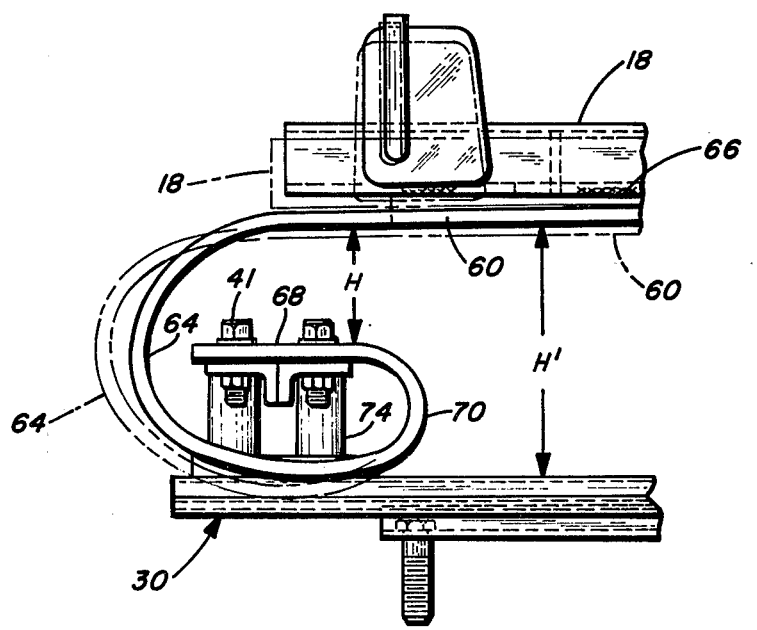
FIG. 4 is a fragmentary, side elevation view partially in section and on an enlarged scale illustrating the deformed "dotted line" condition of one of the leaf-spring members of the invention.

In the invention, the opposite end of the seat frame assembly 10 is resiliently mounted via a pair of spaced, oppositely disposed spring members 56 and 58 mounted for pivotal, rolling movement backward and forward on the frame assembly 30. As the spring members 56 and 58 are preferably of identical construction, the following description will proceed with reference to spring member 58 (FIG. 4) for purposes of illustration. As shown, the spring member 58 is of a leaf-spring construction made from high spring steel including a pair of leg portions 60 and 62, which extend outwardly from a bight portion 64. The leg portion 60 extends generally parallel to and is integrally connected, as by weldments, 66 to the leg 18 of the seat frame assembly 10. The legs 60 and 62 together define a generally U-shaped configuration which opens in a direction toward the spring mechanism 44. In the form shown, the leg portion 62 includes a reverse bent arm portion 68 which extends from another bight portion 70. The arm portion 68 is preferably disposed generally parallel to the general plane of the base frame assembly 30, but is preferably spaced laterally outwardly from the confronting interior surface of the bight portion 64. Moreover, in the generally deflated condition of the spring mechanism 44, the arm portion 68 is disposed generally parallel to the leg portion 60 in the deflated condition of the spring mechanism 44, as illustrated in solid line in FIG. 4. Moreover, in the expanded condition of the spring mechanism 44, the leg portion 60 and, hence, the leg 18 of the seat frame assembly 10 are disposed inwardly and downwardly, as illustrated in dotted line, so as to be disposed at a slightly acute angle in respect to the general plane of the arm portion 68. This upward movement or raising of the seat frame assembly 10 acts to pivotally roll the spring 58 forwardly so as to distend the bight portion 65 forwardly, as illustrated in dotted lines. This pivotal, rolling movement in a forward direction tends to lower the leg portion 60 in a direction toward the generaly horizontal plane of the base frame assembly 30, also as shown in dotted line. Preferably, the arm portion 68 is disposed between or intermediate the leg portions 60 and 62, but may be disposed in a slightly greater direction toward the leg portion 62. In the invention, the radius of curvature of the bight portion 64 is substantially greater than the radius of curvature of the bight portion 70 defined by the reverse bent arm portion 68. Preferably, the ratio of the radii of such bight portions is 2:1. Moreover, the lateral height ratio or span between the respective members H' to H is 2:1.

In the invention, the widthwise dimension of the spring member 58 is greater than the corresponding dimension of the leg portion 18 of the seat frame assembly 10. Preferably, the widthwise dimension of the spring members 56 and 58 is sufficient to prevent or minimize canting or pivotal movement of the seat frame assembly 10 in either sidewise direction in respect to the general vertical plane of the seat, as illustrated in FIG. 2. Moreover, the generally flat construction of the members 56 and 58 imparts sidewise tipping stability to the seat structure while enabling pivotal, rolling movement to the seat structure to minimize "back slap" during normal use thereof. Moreover, by this arrangement there is provided maximum occupant comfort while minimizing lateral sway in the seat structure.

In the form shown, the spring members 56 and 58 are operably connected to the base frame assembly 30 including a T-plate 31 by means of a cross-member 72 (FIG. 2) which, in turn, is attached by bushings or spacers 74 to the base frame assembly 30. The bushings 74 are mounted by bolts 41 (FIG. 4) to the rails 32 and 34 via the cross-plate 54. Thus, the cross-member 72 is fixedly mounted on the base frame assembly 40 via rails 32 and 34. Accordingly, the arm portions 68 of the respective spring members 56 and 58 are fixedly attached to the cross-plate 72 via fasteners 77 on the bushings 74 which provide spacers for mounting the arm portions 68 in generally parallel, spaced relationship in respect to the general horizontal plane of the base frame assembly 10. By this arrangement, the arm portions 68 of the respective spring members 56 and 58 are fixedly attached to the base frame assembly 40 via the bushings so as to mount the same in spaced, generally bisecting relation between the base frame assembly 30 and the seat frame assembly 10. By this arrangement, there is provided optimum pivotal, rolling motion of the seat structure to accommodate the comfort and weight of the occupant upon selective actuation of the penumatic or air spring 44.

Figure 3:
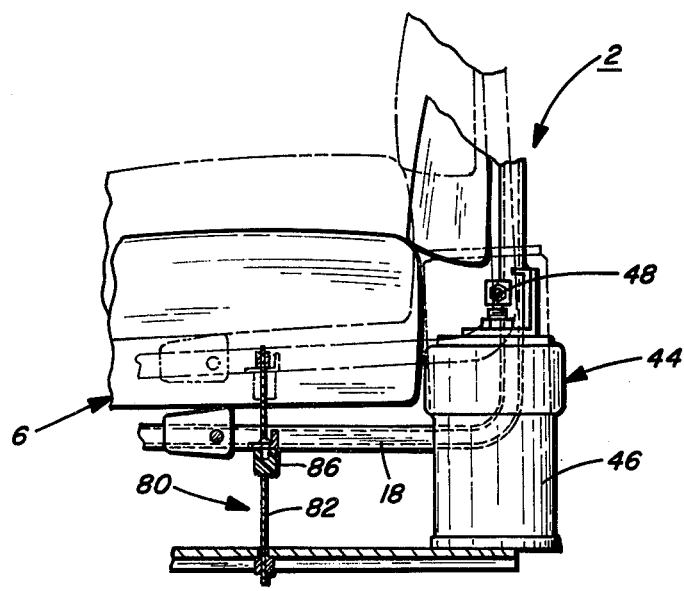
FIG. 3 is a fragmentary, side elevation view on an enlarged scale and partly in section showing the raised "dotted line" and lowered "solid line" position of the automotive seat.

As best seen in FIG. 3, the automotive seat is provided with a stop assembly designated generally at 80 for limiting upward vertical movement of the seat frame assembly 10. In the form shown, the stop includes a wire rope 82 connected at one end, as at 84, to one of the rails 34, while the other end is connected, as at 86, to one of the legs 18 of the seat frame assembly 10. By this arrangement, there is provided a controlled stop for limiting vertical movement of the seat frame 10 assembly 10 in response to the resilient expansion of the air spring 44. Accordingly, vertical adjustment of the seat is defined by the limit of the range of resilient expansibility of the air spring itself. Thus, upon inflation of the air spring 44, the seat frame assembly 10 will raise up (dotted line, FIG. 3), but to a distance not in excess of that permitted by the stop 80. The raising of the seat frame assembly 10 in this manner will effect pivotal movement of the seat frame assembly generally about an axis defined by the geometric centers of the spring members 56 and 58 which act to simultaneously roll forward (dotted line, FIG. 4) this, in turn, acts to move the seat frame assembly 10 slightly forwardly and downwardly in relation to the base frame assembly 8. Thus, it will be seen that the forward end of the seat frame assembly 10 is disposed in a firm yet free floating relation via the spring members 56 and 58, while the rearward end of the assembly is maintained in resilient adjustable mounting on the seat frame assembly so as to selectively accommodate the comfort and weight of the occupant upon simple actuation of the control valve 52. Preferably, the air spring 44 is disposed generally centrally of the automotive seat between the legs 20 and 22 of the frame 14 so as to provide a three-point mounting for the seat frame assembly 10. Due to the construction and arrangement of the springs 56 and 58, canting or torquing of the seat frame assembly is prevented during normal use thereof.

Figure 5:
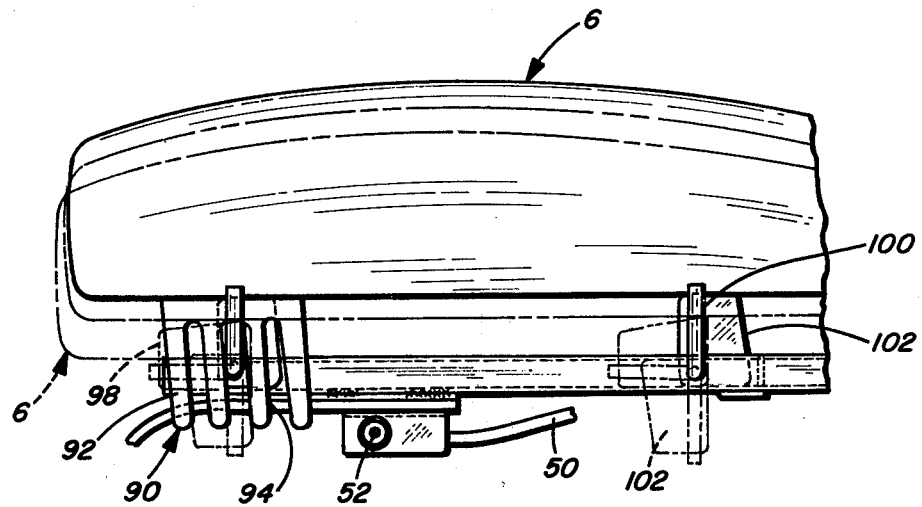
FIG. 5 is fragmentary, side elevation view on an enlarged scale illustrating the adjustment mechanisms for adjusting the front end of the seat cushion.
Figure 6:
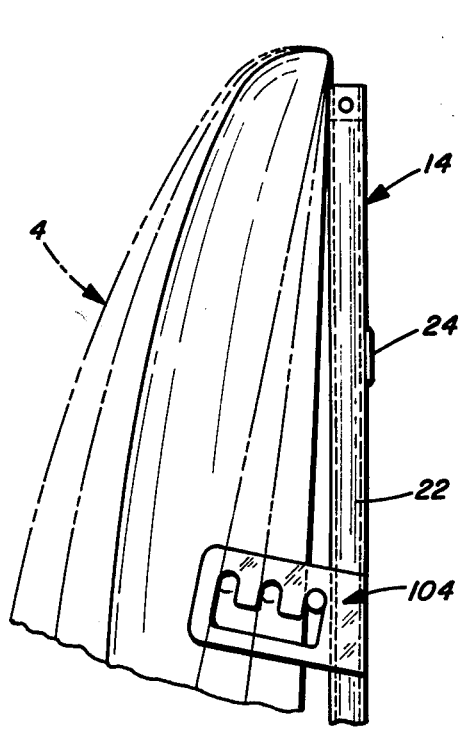
FIG. 6 is a fragmentary, side elevation view on an enlarged scale illustrating another adjustment mechanism for adjusting the back seat cushion relative to the seat frame.
Figure 7:
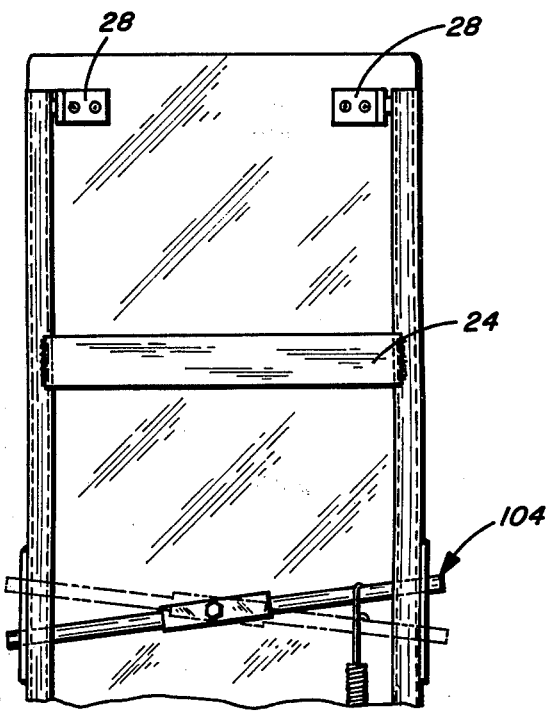
FIG. 7 is a fragmentary, rear elevation view on an enlarged scale looking from the right hand side of FIG. 1 and illustrating the adjustment mechanism of FIG. 6.

As best illustrated in FIGS. 3 and 5, the seat cushion 6 may be provided with a forward adjustment mechanism, designated generally at 90, disposed on either side thereof for providing vertical adjustment of the seat relative to the seat frame assembly 10. As shown, each mechanism 90 includes a bracket-plate 92 secured to the underside of the seat 6 having multiple, parallel slots 94 adapted to receive a crossbar and handle member 96 therein for selectively locking a pair of cam plates 98 in selective positions for raising and lowering the front end of the seat cushion, as illustrated in dotted line in FIG. 5. Similarly, the rear end of the seat cushion 6 may be provided with a similar type bar and handle 100 in conjunction with cam plates 102 for selectively raising and lowering the rear end of the cushion for maintaining the same in a generally horizontal position, as desired. Also, the back cushion 4 may be fixedly attached, as at 28, to the frame 14 with another adjustment mechanism, designated generally at 104 to provide horizontal adjustment of the cushion in a direction toward and away from the frame 104 via slotted bracket plates 106, as aforesaid.

We claim:
1. An automotive seat including,
a resilient suspension system for pivotally supporting a seat, said system comprising,
a base frame assembly adapted for mounting on an automotive floor,
a seat frame assembly adapted for mounting a seat,
at least one loop-like spring means fixedly attached at one end to said seat frame assembly and operably connected at its other end to said base frame assembly for resiliently mounting said seat frame assembly in spaced apart relation relative to said base frame assembly,
fluid power means mounted on said base frame assembly adjacent the end opposite said spring means and operably connected to said seat frame assembly for generally vertically adjusting the latter relative to said base frame assembly,
said spring means comprises a pair of leaf spring members disposed in laterally spaced relation, each of
said spring members including upper and lower leg portions extending from a bight portion,
said upper leg portion fixedly attached to said seat frame assembly,
said lower leg portions connected to said base frame assembly,
said base frame assembly includes a pair of spaced rail members, a support bracket extending transversely between said rail members for connecting the same together at the end opposite said fluid power means, and
said lower leg portions fixedly attached to said support bracket.

2. An automotive seat in accordance with claim 1, wherein
said lower leg portions include reverse bent arm portions extending inwardly between said upper and lower leg portions, and
said arm portions being fixedly attached to said support bracket.

3. An automotive seat in accordance with claim 2, wherein
said spring members are of a generally U-shaped configuration, in side elevation, and
said arm portions disposed generally parallel to the general horizontal plane of said base frame assembly.

4. An automotive seat in accordance with claim 2, wherein
the radii of curvature of each of said bight portions is greater than that of the radii of curvature defined by the reverse bend of said arm portions.

5. An automotive seat in accordance with claim 4, wherein
said radii of curvature are in the ratio of about 2:1.

6. An automotive seat in accordance with claim 1, wherein
said fluid power means comprises an air spring.

7. An automotive seat in accordance with claim 1, including
stop means for limiting pivotal movement of said seat frame assembly in relation to said base frame assembly.

8. An automotive seat including,
a resilient suspension system for pivotally supporting a seat, said system comprising,
a base frame assembly adapted for mounting on an automotive floor,
a seat frame assembly adapted for mounting a seat,
loop-like spring means for resiliently mounting said seat frame assembly in spaced apart relation relative to said seat frame assembly,
fluid power means mounted on said base frame assembly adjacent to the end opposite said spring means and operably connected to said seat frame assembly for generally vertically adjusting the latter relative to said base frame assembly,
said spring means comprises a pair of leaf spring members disposed in laterally spaced relation,
each of said spring members including upper and lower leg portions extending from a bight portion, said upper leg portions fixedly attached to said seat frame assembly, said lower leg portions connected to said base frame assembly, a support bracket mounted on said base frame assembly at the end opposite from said fluid power means, said lower leg portions being fixedly attached to said support bracket to provide a generally rolling pivotal movement of said seat about the end supported by said leaf-spring member upon the raising and lowering of the opposite end of said seat upon adjustment of said fluid power means.

9. An sutomotive seat in accordance with claim 1, wherein said lower leg portions include reverse bent arm portions disposed between said upper and lower leg portions and fixedly connected to said base frame assembly, and said reverse bent arm portions are fixedly connected to said support bracket in spaced apart relation relative to said base frame assembly and said seat frame assembly.

10. An automotive seat in accordance with claim 8, wherein the radii of curvature of each of said bight portions is greater than that of the radii of curvature defined by the reverse bend of said arm portions.

11. An automotive seat in accordance with claim 9, wherein said radii of curvature are in the ratio of about 2:1.

* * * * *